Figure 1:
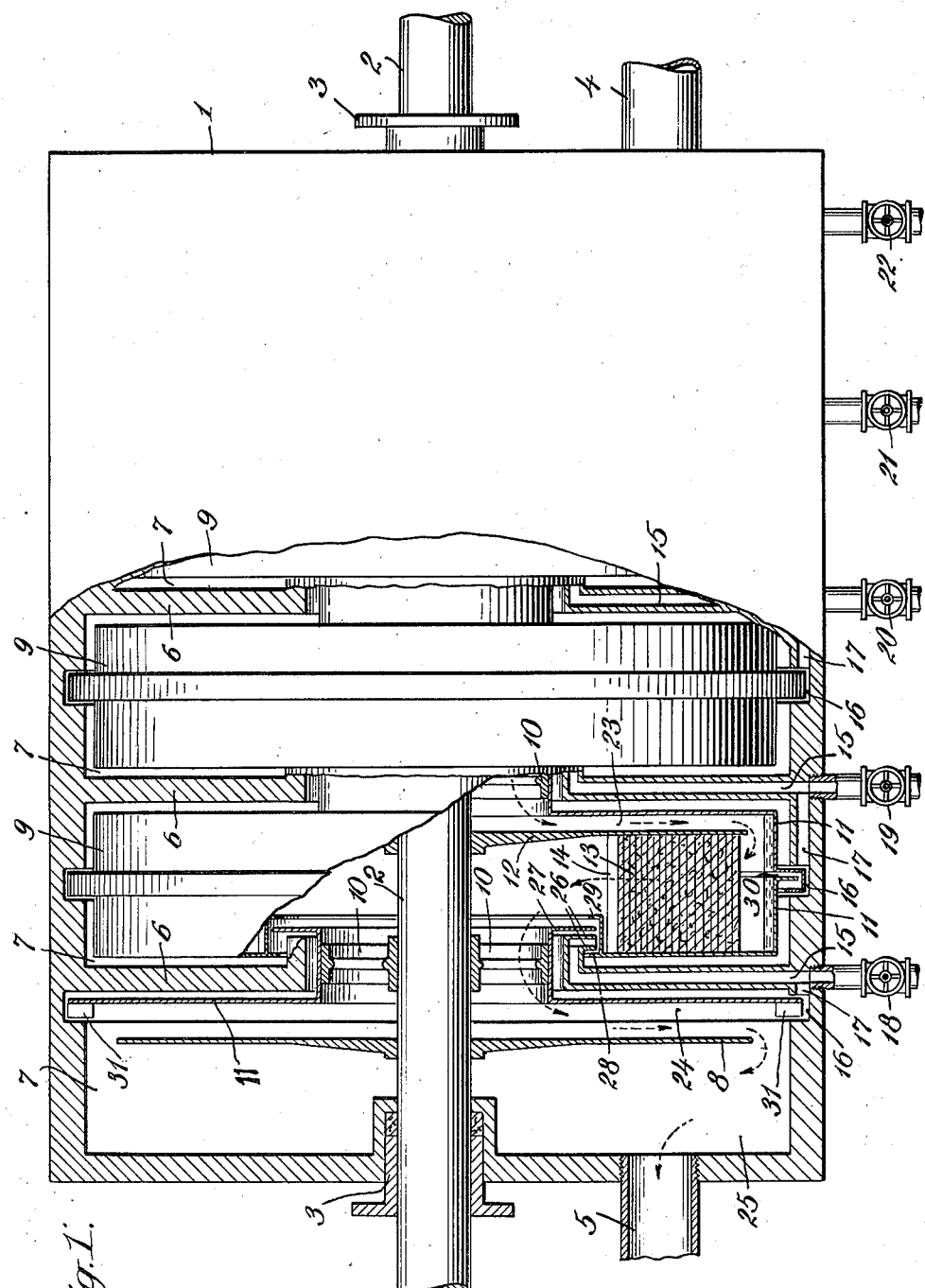

Feb. 6, 1940.   H. W. SHELDON ET AL   2,189,230
CENTRIFUGAL CONTACTING APPARATUS
Filed Jan. 24, 1939   2 Sheets-Sheet 1

INVENTORS
FRANK C. FAHNESTOCK
HOWARD W. SHELDON
BY
ATTORNEY

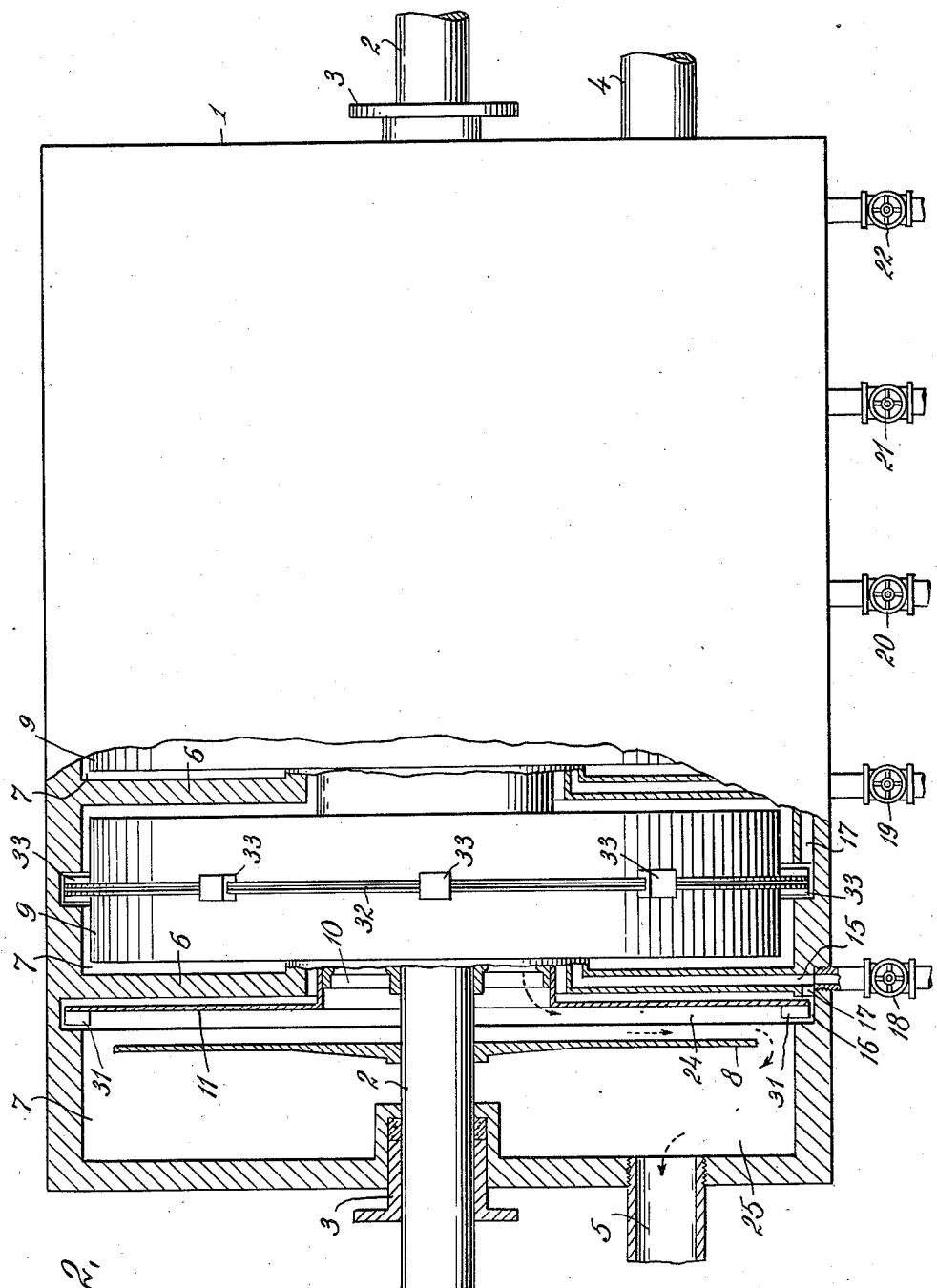

Patented Feb. 6, 1940

2,189,230

UNITED STATES PATENT OFFICE 2,189,230

CENTRIFUGAL CONTACTING APPARATUS

Howard W. Sheldon, Clarksboro, and Frank C. Fahnestock, Woodbury, N. J., assignors to Socony-Vacuum Oil Company, Incorporated, New York, N. Y., a corporation of New York Application January 24, 1939, Serial No. 252,558

6 Claims. (Cl. 261—83)

This invention is directed to a novel form of apparatus for carrying out diffusional processes involving interaction between fluids of differing densities. Diffusional processes of this kind are typified by the processes of distillation, absorption, extraction, and the like. Typical of such processes is the operation of fractionation, wherein vapors are repeatedly contacted with reflux liquid while flowing countercurrently thereto. Exactly parallel is the process of absorption, wherein gases containing some constituent to be extracted are counterflowed against an extractive or absorptive fluid in which it is dissolved.

In the past it has been customary to carry out such diffusional processes in bubble cap columns, packed columns, wetted wall columns, or spray chambers. Such devices operate at low fluid velocities, requiring bulky equipment for large capacities. All of these are based upon the use of gravity for the essential separation of fluids. Some tentative departures from convention have been made in the provision of a "wetted wall" type of device in which the contact area is contained within a spiral tube rotated at high velocity to secure centrifugal separation of light and heavy fluid.

This invention has for an object the provision of apparatus utilizing centrifugal force for repeatedly contacting and separating two or more fluids of different densities. Another object is the provision of equipment wherein additional or lesser amounts of one fluid may be applied to the second fluid at varying points along its course, or wherein the second fluid may be subjected to successive treatments with entirely different fluids. Another object is the provision of equipment whose efficiency does not depend upon meticulous alignment of construction. Further objects are the provision of internal entrainment separation, radial flow of material, independent addition or removal of heat at any point, and such other objects as will hereinafter appear.

In general, the type of equipment described consists of a packed tower of sectional design so mounted that it may be rotated at a high rate of speed thereby causing centrifugal force to act on the fluids in the tower. The denser of the fluids is thus forced radially outward through a given section and picked up at the outer portion of the rotating element by the impellers of a centrifugal or turbine type pump which constitutes the outermost part of the rotating element. These in turn transmit the material to a stationary outer casing external to the rotating element. This casing is equipped with suitable channels through which the fluid is transmitted from the outside of one stage to the inside of the next. The lighter fluid is forced through the equipment countercurrently to the denser fluid through channels provided wholly within the rotating element. Thus there results a countercurrent stepwise process in which each step is likewise a countercurrent operation in itself. Suitable inlet and outlet connections are provided permitting the operating of the equipment under any suitable pressure above or below atmospheric pressure and provisions are made for the addition or removal of material at any desired point in the equipment.

In order to understand our invention, reference is now made to the drawings attached to this specification, Figure 1 of which shows in diagrammatic form an embodiment of our invention, certain modifications being shown in Figure 2.

In these drawings, 1 denotes a sectional, non-rotating exterior casing, forming the shell of the apparatus, which is broken away in part to show interior construction. This casing may be mounted either horizontally, as shown, or vertically. It may be supported in any suitable manner. Through cylindrical casing 1 there passes shaft 2, positioned in bearings 3, which are suitably designed to prevent escape of treated materials. Numerous forms of such bearings and packings exist, any of which may be used, and the showing here is only diagrammatic. Casing 1 is provided with pipes 4 and 5 for entry and exit, respectively, of the lighter fluid to be treated. Interiorly, the casing 1 is divided by partitions 6 into compartments 7, 7, 7, any number of which, as determined by the necessities of the process conducted, may be used. In the end chamber 7 nearest the light fluid exit there is mounted upon the shaft 2 a plate 8, for a purpose later described. In each interior chamber 7 there is mounted upon the shaft 2 a rotor 9. All rotors 9 are inter-connected and together serve to define the portion of the apparatus within which the light fluid passes. These rotor bodies 9 are suitably connected to the shaft 2 at appropriate points, as by spiders 10. Each of the rotors 9 consists of an external shell member 11 and an interior plate 12. Within each rotor, between shell 11 and plate 12 there is positioned a packing member 13 in the form of an annulus of rectangular cross-section. This packing member may be made of packed screen, of stacked perforated metal shapes, or of ceramic or other material properly packed and supported. Its purpose is to provide an area of extended surfaces through which two fluids may pass countercurrently and be contacted in passing, as in a packed fractionating column. A convenient form of packing material is packed expanded metal, resembling the "coolers" or flame arrestor grids used in fireproof vapor outlets for tanks. Upon the interior surface of this packing annulus there is preferably placed a series of liquid distributors 14, which may be conveniently formed as small bars or dams placed axially upon the said surface. Each of the interior partitions 6 in casing 1 are formed with interior passages 15. These may be formed by radially coring the partition at one or more points as shown, or the entire partition may be made hollow to provide such passages. Adjacent to the outer end of each partition there is formed in the interior of shell 1 a circumferential groove 16, each of which communicates with the adjacent passage 15 by one or more conduits 17. Each passage 15 is provided with valved fittings 18, 19, 20, 21, and 22, communicating with fluid handling equipment external to the apparatus and not shown.

For convenience of description, the operation of treating gas with absorbent liquid will now be considered. The flow of gas is shown by dotted arrows. Within each rotor 9, the gas first enters from the preceding rotor and flows radially outward through space 23 between rotor shell 11 and rotor plate 12. In space 23, due to centrifugal action, any entrained liquid is thrown out, to collect on the interior periphery of rotor 9. The gas then flows radially inward through packing material 13, where it is contacted with liquid, then flows axially through spider 10 and again radially outward through entrainment separation space 24 and so into the end zone 25 and out of the apparatus through 5. Plate 8, previously mentioned, serves to define this final entrainment separation space. Liquid with which to treat the gas is supplied through valved fitting 18 to pass through passage 15 by which it is led to a liquid sealed inlet composed in part of partition parts 26 and of rotor shell parts 27, 28, 29, of which 28 and 29 form an annular liquid channel from which liquid overflows into the rotor to be distributed by devices 14 within packing 13. Flowing through 13, wherein it contacts the gas the liquid is collected upon the inner periphery of rotor shell 11, together with entrainment liquid from space 23. Due to centrifugal force, the liquid so collected flows out through a peripheral sealed passage 30 into the appropriate channel 16, where from, with the rotor acting therein as the impeller of a centrifugal pump, it flows through conduit 17 to the next passage 15. All liquid may pass thence to the next contact stage, or a portion may be withdrawn or added by valved fitting 19. Entrainment from the end zone 24, collecting in the adjacent groove 16, is forced by small impellers 31 placed upon rotor shell 11 to return to contact through conduit 17, (at left end of drawing), and passage 15. Liquid material from the process may be withdrawn through fitting 22 and, as explained at fitting 19, fittings 20 and 21 may likewise be used to add to or lessen the relative volume of liquid contacted in any stage. By provision of separate passages 15 within any desired partition and proper valved fittings leading thereto, as will be obvious, it is possible to treat with entirely different liquids at any desired contacting stage or stages. Similarly, by independent external adjustment of the temperature of the liquid which may be supplied to each stage, widely varying temperature conditions may be obtained in adjacent stages if desired.

The exact form of functional elements of the disclosed apparatus may be varied, as will be obvious. For example as shown in Figure 2, instead of the sealed passage 30 in the periphery of rotor shell 11, a simple peripheral slot 32 formed by upstanding flanges upon the two portions of rotor shell 11 may be used. Astride this slot 32, at intervals, there would be placed impellers 33, to assist in the centrifugal pump function of the rotor.

It may be seen that the distinctive features of our apparatus are the following:

Our equipment consists of an outer stationary shell or casing divided into suitable open compartments within which is mounted a rotating casing which contains the active contacting surface of the equipment.

The outer shell or casing is sectional in design to facilitate its assembly and it is provided with suitable connections to permit the introduction of both the lighter and heavier fluid or fluids through connections made to the casing. Suitable centrifugal or other seals are provided between the rotating inner casing and the stationary outer casing to cause the lighter and denser fluids to pursue their proper paths and to prevent them from bypassing from one stage of the equipment to the next.

The outer casing is also provided with suitable fluid channels to permit the transfer of the denser fluid or fluids from one stage of the equipment to the next. These fluid channels are independently provided with external connections whereby any portion or all of the material being transferred from one stage of the equipment to the next may be removed and additional or other material may be added, and the stages of the equipment may be utilized in any desired order.

The inner casing is likewise sectional in construction and consists of the same number of compartments as are provided in the outer shell.

Each section of the rotating casing consists of an outer shell, an inner space or passage through which the lighter fluid is transmitted from one stage to the next, a radial entrainment separating space, a packed space in which the phases are contacted, an outer peripheral seal or seals, an inner seal, suitable distributing devices for the denser phase, and suitable peripheral impellers for the transfer of the denser phase or phases to other parts of the equipment or to other external equipment.

The entire inner casing is mounted on a shaft which passes through the equipment and is suitably sealed at its points of passage through the outer casing to prevent the escape of the fluids being handled, or the entrance of air from external sources. This shaft carries the rotating casing and is suitably supported in bearings either internal or external to the equipment and is connected to a prime mover which causes the rotating portion of the equipment to revolve at a suitable speed. The equipment may operate either horizontally or vertically as desired and may be so designed that the pressure drop through the system will compensate for most of the thrust against the driving equipment caused by the weight of the rotating parts.

This equipment provides for utilization of high fluid velocities by maintaining the separation of phases through use of centrifugal force thereby reducing the dimensions of the equipment. It provides for the maximum utilization of the space by having it suitably packed. It utilizes a radial flow of material thereby eliminating the necessity of having perfectly aligned surfaces. It compensates for temperature differences by maintaining a small temperature gradient at any transverse section of the equipment. It provides for the introduction or removal of heat or material at any intermediate point in the equipment. It provides for changing the point of addition or removal of this heat or material without changes to the internal structure of the equipment. It provides for the separation of more than one liquid phase either internally or externally if desired and its independent removal or handling. It provides internal entrainment disengaging passages whereby it can operate at higher fluid velocities for the same centrifugal force than possible in any other type of equipment.

In addition to previously mentioned advantages, this type of construction permits the rigid connection of all communicating piping, since all connections are made to the stationary casing. It further permits the maximum flexibility of operation, since the rates of flow through the packing may be varied by varying the rotational speed of the inner casing. It permits the standardization of parts, since the various sections of the equipment are similar in design. It permits the elimination of certain items of pumping equipment by incorporating this equipment in its design. It permits the operation under any desired absolute pressure and over any temperature range provided only that the stationary casing is made capable of withstanding such pressure and temperature conditions, and that the rotating members are capable of withstanding the rotational stresses at the operating temperature. It provides for an extremely small fluid holdup, since dimensions of the equipment are comparatively small, which in turn permits equilibrium conditions to be achieved in a minimum of time. It permits the addition or removal of heat by direct contact within the equipment by circulating an immiscible heating or cooling medium through one or more compartments of the equipment while carrying out an independent process.

We claim:

1. Apparatus for contacting fluids of different densities comprising a sealed non-rotating cylindrical shell having means to flow lighter fluid therethrough in a generally axial direction, within said shell an axial shaft and a cylindrical rotor supported and rotated by said shaft, seal means to prevent light fluid from passing between said shell and the periphery of said rotor, means to allow light fluid to enter said rotor axially at one end thereof, means to permit light fluid to depart axially from its other end, within said rotor partition means causing said light fluid to pass radially from center to periphery and then from periphery to center of said rotor through a flow space, without departing from the interior of said rotor, means to introduce heavier fluid to said flow space to flow radially outward therethrough, extended surface means in said flow space, a liquid collecting space within said rotor at its periphery, and means to permit heavier liquid to escape from the rotor near its periphery.

2. Apparatus for contacting fluids of different densities comprising a sealed non-rotating cylindrical shell having one or more open centered radial interior partitions, inlet and outlet means whereby a light fluid may pass through it in a generally axial direction, an axial shaft within said shell, on said shaft at least one rotor disposed adjacent one of said partitions on the inlet side thereof in the direction of light fluid flow, seal means to prevent flow of light fluid between rotor periphery and shell wall, means to admit light fluid to the interior of said rotor, within said rotor a flow passage so arranged that light fluid must flow radially inwardly therethrough, extended surface means in said flow passage, an annular trough attached to said rotor and located in said flow passage inwardly of said extended surface, conduit means located in said partition to deliver heavier liquid into said trough, from whence said heavy liquid flows radially through said flow space to the periphery of said rotor, and means to permit heavy liquid to escape from the interior of said rotor near its periphery.

3. Apparatus for contacting fluids of different densities comprising a shaft, a plurality of rotor bodies attached to and rotated by said shaft, a non rotating cylindrical shell closely encasing said rotor bodies, means to pass light fluid in a generally axial direction through said rotor bodies and said shell, partitions mounted interiorly of said shell to divide it into one or more compartments in each of which is a rotor body, cooperative seal means between each partition and the adjacent rotor body to prevent flow of light fluid between rotor periphery and shell wall, in each rotor body a partition causing light fluid to flow radially outward and then radially inward through a flow space, extended surface means in said flow space, a passage in each partition for heavy liquid to flow radially inward, means to pass heavy liquid from such passages into the interior of each rotor body to flow radially outward through said flow space, means to pass heavy liquid outward through the periphery of each rotor body, channels in said shell adjacent to each partition to collect said escaping heavy liquid, conduit means from each channel to the passage in the partition next anterior in direction of light fluid flow, means to initially introduce heavy liquid and means to finally remove heavy liquid.

4. Apparatus to effect multiple contacting and separation of a light fluid and a heavy fluid comprising a rotor body supported upon a shaft within a non-rotating enclosing shell, means to pass a light fluid into and through said rotor body, said rotor body comprising alternate restricted and enlarged portions, in each enlarged portion an imperforate partition of less diameter than the rotor body enlargement dividing said enlarged portion into a passage through which light fluid flows radially outward and a flow space wherein it flows radially inward, extended surface packing means in each flow space, means to introduce heavy liquid to the interior of each flow space to flow radially outward therethrough, means to permit said heavy liquid to escape from each rotor enlargement near the periphery thereof, channel means in said shell to collect such escaping heavy liquid, means to pass heavy liquid so collected to the flow space next anterior in direction of light fluid flow, means to originally introduce heavy liquid and valve means associated with each heavy liquid collecting channel to permit withdrawal from or addition to said collected liquid.

5. Apparatus for contacting fluids of different densities comprising a sealed non-rotating cylindrical shell having means to flow lighter fluid therethrough in a generally axial direction, within said shell an axial shaft and a cylindrical rotor supported and rotated by said shaft, seal means to prevent light fluid from passing between said shell and the periphery of said rotor, means to allow light fluid to enter said rotor axially at one end thereof, means to permit light fluid to depart axially from its other end, within said rotor partition means causing said light fluid to pass radially from center to periphery and then from periphery to center of said rotor through a flow space, without departing from the interior of said rotor, means to introduce heavier fluid to said flow space to flow radially outward therethrough, extended surface means in said flow space, a liquid collecting space within said rotor at its periphery, and means to permit heavier liqud to escape from the rotor near its periphery, said escape means comprising a peripheral slot in said rotor, a radial flange on one side of said slot, and a reversely bent sealing flange extending from the other edge of said slot to form a seal cup over said first flange.

6. Apparatus for contacting fluids of different densities comprising a sealed non-rotating cylindrical shell having means to flow lighter fluid therethrough in a generally axial direction, within said shell an axial shaft and a cylindrical rotor supported and rotated by said shaft, seal means to prevent light fluid from passing between said shell and the periphery of said rotor, means to allow light fluid to enter said rotor axially at one end thereof, means to permit light fluid to depart axially from its other end, within said rotor partition means causing said light fluid to pass radially from center to periphery and then from periphery to center of said rotor through a flow space, without departing from the interior of said rotor, means to introduce heavier fluid to said flow space to flow radially outward therethrough, extended surface means in said flow space, a liquid collecting space within said rotor at its periphery, and means to permit heavier liquid to escape from the rotor near its periphery, said escape means comprising a peripheral slot in said rotor, with radially extending flanges upon either side of said slot, and a circumferential channel in the shell forming a seal channel into which said flanges extend.

HOWARD W. SHELDON.
FRANK C. FAHNESTOCK.